(12) United States Patent
Sze et al.

(10) Patent No.: US 11,695,915 B1
(45) Date of Patent: Jul. 4, 2023

(54) APPARATUS AND METHOD FOR IMAGING LENS ALIGNMENT USING A VIRTUAL TEST IMAGE

(71) Applicant: ASMPT SINGAPORE PTE. LTD., Singapore (SG)

(72) Inventors: Wui Fung Sze, Hong Kong (HK); Jiangwen Deng, Hong Kong (HK); Hei Lam Chang, Hong Kong (HK)

(73) Assignee: ASMPT SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/671,658

(22) Filed: Feb. 15, 2022

(51) Int. Cl.
| | |
|---|---|
| *H04N 5/335* | (2011.01) |
| *H04N 17/00* | (2006.01) |
| *G03H 1/22* | (2006.01) |
| *G02B 27/62* | (2006.01) |
| *G02B 3/14* | (2006.01) |
| *H04N 23/54* | (2023.01) |
| *H04N 23/55* | (2023.01) |
| *H04N 23/56* | (2023.01) |

(52) U.S. Cl.
CPC ............. *H04N 17/002* (2013.01); *G02B 3/14* (2013.01); *G02B 27/62* (2013.01); *G03H 1/2205* (2013.01); *G03H 1/2286* (2013.01); *H04N 23/54* (2023.01); *H04N 23/55* (2023.01); *H04N 23/56* (2023.01); *G03H 2001/221* (2013.01)

(58) Field of Classification Search
CPC ..................................................... G02B 27/62
See application file for complete search history.

(56) References Cited

U.S. PATENT DOCUMENTS

| | | | | |
|---|---|---|---|---|
| 10,187,636 | B2 * | 1/2019 | Wong | H04N 23/57 |
| 11,070,709 | B2 * | 7/2021 | Lee | G02B 27/62 |

* cited by examiner

*Primary Examiner* — Gary C Vieaux
(74) *Attorney, Agent, or Firm* — Ostrolenk Faber LLP

(57) ABSTRACT

An alignment apparatus for aligning a lens module with respect to an image sensor includes a holographic film including a test chart pattern from which a virtual image of the test chart pattern may be generated, and a light source for illuminating the holographic film. An image sensor holder is provided for mounting the image sensor and a lens module holder is configured and positioned for mounting the lens module between the holographic film and the image sensor such that the virtual image of the test chart pattern is viewable by the image sensor through the lens module. The virtual image thus viewable by the image sensor through the lens module is located at a virtual distance from the image sensor that is different from a physical position of the holographic film for aligning the lens module with respect to the image sensor.

13 Claims, 4 Drawing Sheets

APPARATUS AND METHOD FOR IMAGING LENS ALIGNMENT USING A VIRTUAL TEST IMAGE

FIELD OF THE INVENTION

The invention relates to an apparatus and method for aligning an image sensor relative to a lens module, and in particular, to aligning them prior to fixing the lens module to the image sensor during the assembly of an imaging camera module.

BACKGROUND

Image quality checking is performed during lens alignment between a lens module and an image sensor prior to conducting bonding of the lens module to the image sensor. Typically, it is necessary to align the lens module relative to the image sensor, or to test an aligned imaging module (comprising the lens module and the image sensor), by viewing a test chart with the image sensor through the lens module. The sharpness of various parts of the test chart, especially the edges of the test chart, are evaluated at different locations of a field of view of the imaging module. However, for applications utilizing a wide-angle lens, where for instance, a viewing angle of the lens module exceeds 60 degrees, large test charts of several meters in size placed at a distance from the lens module are required to cover the entire field of view of the imaging module. Moreover, such test charts have to be positioned at distances corresponding to focusing distances that are required for alignment, such as 5 or 10 meters away from the imaging module. Thus, a large machine size and footprint would be necessary for housing these large test charts.

One approach for reducing the machine size and footprint is to use multiple collimators to form images at various viewing angles to provide coverage for a field of view of the imaging module, such as in U.S. Pat. No. 10,187,636 B2 entitled, "Active Lens Alignment System". When aligning an image sensor relative to a lens module prior to fixing the image sensor to the lens module, an exposure of the image sensor is turned on and the image sensor is moved to different distances relative to the lens module. At certain predetermined distances between the image sensor and the lens module, a calibration pattern is illuminated using collimators, and two or more pictures of the calibration pattern which is focused through the lens module are captured with the image sensor to produce at least two pictures of the calibration pattern captured at different distances. The exposure of the image sensor is then turned off and the pictures of the calibration pattern are analyzed for determining an alignment between the lens module and the image sensor.

Instead of a traditional test chart, a collimator module, which includes a multiple collimators, is implemented to direct calibration or chart patterns to the image sensor through the lens module. This may reduce the space required by the machine as compared to using a traditional test chart. Nevertheless, each collimator still needs to occupy a physical space in the machine, and each collimator is only able to form an image at limited angles to avoid physical interference from other collimators that are positioned next to it. As a result, the size of the active alignment machine is still relatively large when being used for testing imaging modules with viewing angles exceeding 70 degrees. Furthermore, the measuring angles that are available to such a machine are limited due to the physical constraints of arranging the collimators as mentioned above.

It would be beneficial to provide an apparatus and method for testing the alignment of imaging modules which can avoid the use of physical test charts. The use of virtual test charts may avoid the need for a size of the test chart to have to correspond directly to a field of view of the imaging module being aligned, so that the size of a machine that is necessary for housing such a test chart can be greatly reduced as compared to the prior art.

SUMMARY OF THE INVENTION

It is thus an object of this invention to seek to provide an alignment apparatus and method for an imaging module which relies on a virtual test chart in order to reduce the size and footprint of active alignment imaging machines.

According to a first aspect of the invention, there is provided an alignment apparatus for aligning a lens module with respect to an image sensor, the alignment apparatus comprising: a holographic film including a test chart pattern from which a virtual image of the test chart pattern may be generated; a light source for illuminating the holographic film; an image sensor holder for mounting the image sensor; a lens module holder configured and positioned for mounting the lens module between the holographic film and the image sensor such that the virtual image of the test chart pattern is viewable by the image sensor through the lens module; wherein the virtual image viewable by the image sensor through the lens module is located at a virtual distance from the image sensor that is different from a physical position of the holographic film for aligning the lens module with respect to the image sensor.

According to a second aspect of the invention, there is provided a method for aligning a lens module with respect to an image sensor, the method comprising the steps of: providing a holographic film including a test chart pattern; illuminating the holographic film with a light source to generate a virtual image of the test chart pattern; mounting the image sensor on an image sensor holder; mounting the lens module on a lens module holder between the holographic film and the image sensor such that the virtual image of the test chart pattern is viewable by the image sensor through the lens module; and with the image sensor, viewing the virtual image which is located at a virtual distance from the image sensor that is different from a physical position of the holographic film, whereby to align the lens module with respect to the image sensor.

According to a third aspect of the invention, there is provided a method for manufacturing a camera module, the method comprising the steps of: providing a holographic film including a test chart pattern; illuminating the holographic film with a light source to generate a virtual image of the test chart pattern; mounting an image sensor on an image sensor holder; mounting a lens module on a lens module holder between the holographic film and the image sensor such that the virtual image of the test chart pattern is viewable by the image sensor through the lens module; with the image sensor, viewing the virtual image which is located at a virtual distance from the image sensor that is different from a physical position of the holographic film, whereby to align the lens module with respect to the image sensor; and thereafter fixing the lens module and the image sensor to each other to form a camera module after the lens module and the image sensor have been aligned.

These and other features, aspects, and advantages will become better understood with regard to the description section, appended claims, and accompanying drawings.

BRIEF DESCRIPTION OF THE DRAWINGS

An embodiment of the present invention will now be described, by way of example only, with reference to the accompanying drawings, in which.

In the drawings, like parts are denoted by like reference numerals.

DETAILED DESCRIPTION OF THE PREFERRED EMBODIMENT OF THE INVENTION

Computer-generated holography ("CGH") is a method of digitally generating holographic interference patterns. A holographic image can be generated, for example, by digitally computing a holographic interference pattern and printing it onto a film for subsequent illumination by a suitable coherent light source. CGHs have the advantage that the objects which are to be shown do not have to possess any physical reality at all, and can be completely synthetically generated by a computer to be imprinted on a holographic film.

Figure 1:
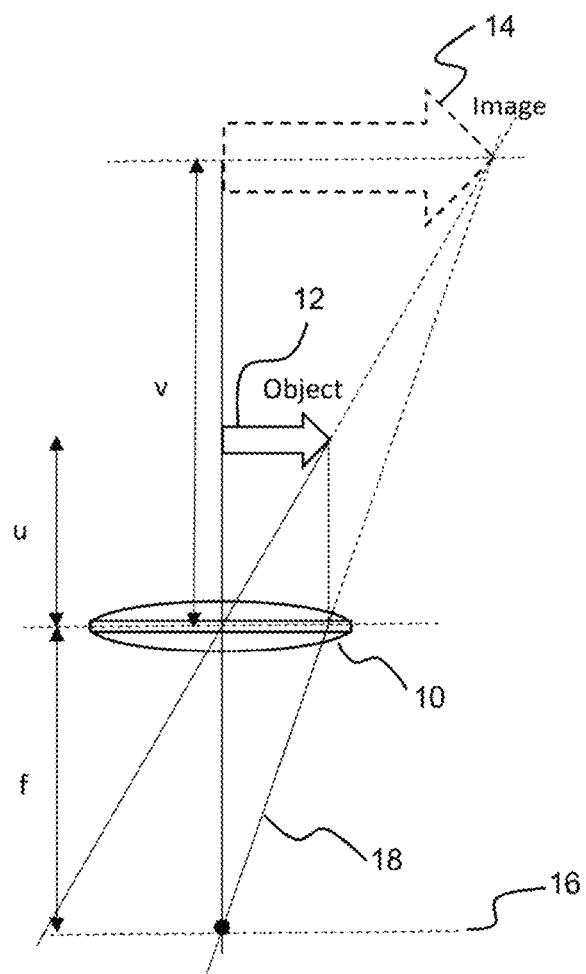
FIG. 1 illustrates an application of a basic lens formula for relating an image position to a physical position of a laser beam which is applicable to the embodiment of the invention described herein.

FIG. 1 illustrates the application of a basic lens formula for relating an image position to a physical position of a coherent light source such as a laser beam which is applicable to the embodiment of the invention described herein.

A relationship between a focal length (f) of a lens, an image position (v) and the physical position (u) of an object such as a laser spot can be expressed according to the lens equations:

$$1/v + 1/u = 1/f$$

$$v = 1/(1/f - 1/u)$$

Therefore, if the lens is a collimator lens 10, by knowing the focal length (f) of the collimator lens 10 and its physical position, and the physical position (u) of the laser spot after passing through the collimator lens 10, the image position (v) (which in this application, is a virtual image of the laser spot) can be determined.

When u=f (where the physical position of the laser spot is equal to the focal length of the lens), a virtual image of the laser spot would be formed at infinity, since collimated light rays would result from this arrangement. On the other hand, different values of v can be generated by changing either u (such as by physically moving the position of a laser spot with respect to the collimator lens 10) or by changing f (such as by varying a focal length of an optical lens by either changing the lens or by adopting a variable focus lens, for instance, a liquid lens).

Figure 2:
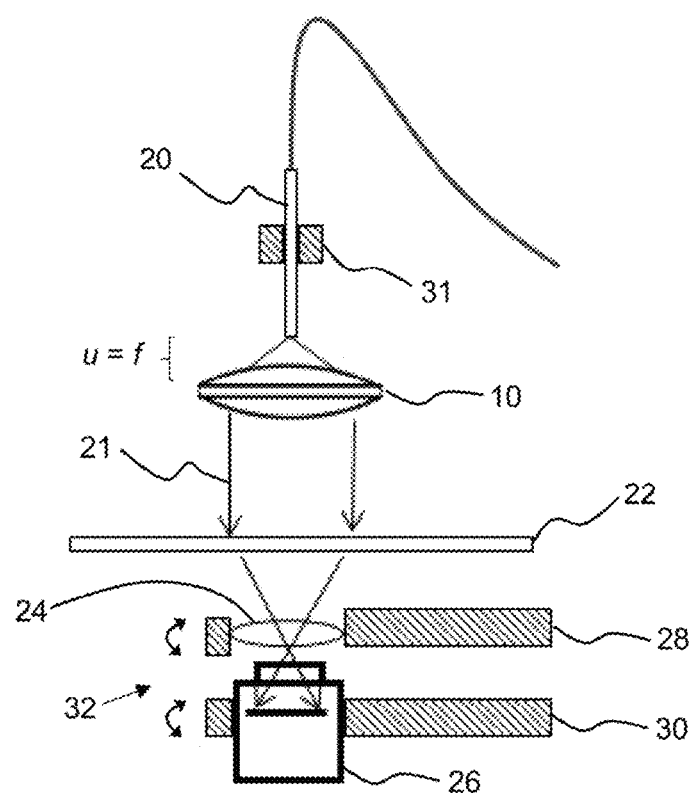
FIG. 2 is a side view of an alignment apparatus according to the preferred embodiment of the invention, wherein an image sensor may view a virtually-reconstructed test chart image on a holographic film illuminated by a laser source.

FIG. 2 is a side view of an alignment apparatus according to the preferred embodiment of the invention, wherein an image sensor 26 may view a virtually-reconstructed image on a holographic film 22 (such as a Fourier holographic film), illuminated by a light source, which may be in the form of a coherent light source such as a laser source 20. The laser source 20 emits a laser beam towards the collimator lens 10, and light rays from the laser beam are passed through the collimator lens 10. This collimates coherent light rays from the laser beam when a distance (u) between the laser source 20 and the collimator lens 10 is equal to a focal length (f) of the collimator lens 10.

The collimated light rays 21 are then passed through the holographic film 22 for illuminating the holographic film 22, and are focused by a lens module 24 onto an image sensor 26. The lens module 24 needs to be actively aligned relative to the image sensor 26 so that the lens module 24 may then be attached to the image sensor 26 to form an imaging camera module 32 once the two components have been correctly aligned to acquire a focused image which is received by the image sensor 26. The lens module 24 is held by a lens module holder 28 which is operative to adjust the lens module 26 in six axes of freedom. Separately, the image sensor 26 is held by a sensor holder 30 which is operative to adjust the imaging sensor 26 in another six degrees of freedom.

The lens module holder 28 is configured and positioned for mounting the lens module 24 between the holographic film 22 and the image sensor 26 so that a test chart pattern imprinted in the holographic film 22 is viewable by the image sensor 26 through the lens module 24.

As explained above, when u=f, a virtual image of a laser spot produced by the laser source 20 is formed at infinity. This may allow an image of a test chart formed on the holographic film 22 to be aligned at a single predetermined distance between the test chart and the image sensor 26. However, by using the apparatus according to the present invention, it is possible to also generate virtual test charts that appear to be at different distances (v) with respect to the image sensor 26 by varying a position of the laser source 20 (u) or by changing a focal length (f) of the collimator lens 10. In particular, virtual test charts generated at different distances (v) with respect to the image sensor 26 can be obtained when a distance between the laser source 20 and the collimator lens 10 is different from a focal length (f) of the collimator lens 10, such that light rays from the laser source 20 are not collimated after passing through the collimator lens 10.

Figure 3:
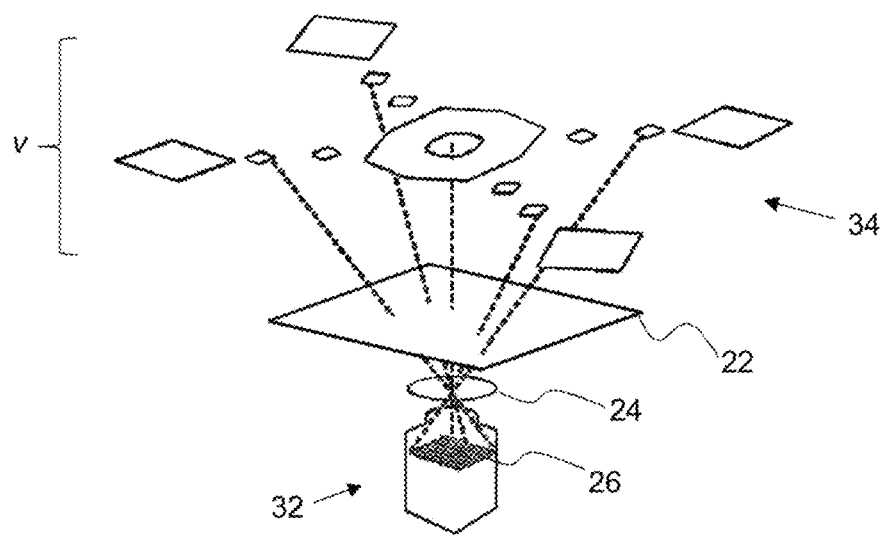
FIG. 3 is an isometric view of the alignment apparatus of FIG. 2, which illustrates an exemplary virtual test chart reconstructed from the holographic film that is viewable by the image sensor.

FIG. 3 is an isometric view of the alignment apparatus of FIG. 2, which illustrates an exemplary virtual test chart 34 reconstructed from the holographic film 22 that is viewable by the image sensor 26 for aligning the lens module 24 with respect to the image sensor 26. For instance, by moving the laser source 20 relative to the collimator lens 10, a phase of light rays 21 arriving at the holographic film 22 is changed. The holographic film 22 includes a test chart pattern from which a virtual image of the test chart pattern may be generated. The virtual image viewable by the image sensor 26 through the lens module 24 is located at a virtual distance from the image sensor 26 that is different from a physical position of the holographic film 22 for the purpose of aligning the lens module 24 with respect to the image sensor 26.

The result is that a virtual test chart 34 including the test chart pattern is viewable at a virtual distance that is not bound to the focal length (f) of the collimator lens 10, so that the virtual test chart 34 may appear to be at a much further distance than an actual distance of the laser source 20 and the holographic film 22 from the image sensor 26.

In order to move the laser source 20 relative to the collimator lens 10, a positioning mechanism 31 (see FIG. 2) may be coupled to the laser source 20 for adjusting a position of the laser source 20 and to vary a separation distance between the laser source 20 and the holographic film 22. On the other hand, to facilitate changing the focal length of the collimator lens 10, the collimator lens 10 may be in the form of a liquid lens, which has a variable focal point.

The benefit of the above approach is that the collimator lens 10 is able to form a virtual image to be used for active alignment at a distance that far exceeds the size of an active alignment machine, without having to increase the viewing angles that are viewable by the image sensor 26. The lens module 24 is operative to focus the image of the virtual test chart 34 onto the image sensor 26 during relative alignment between the lens module 24 and the image sensor 26 at different virtual distances of the virtual test chart 34 from the image sensor 26. The lens module holder 28 and the image sensor holder 30 are therefore able to adjust positions and orientations of the lens module 24 and the image sensor 26 respectively until the image sensor 26 acquires a focused image of the virtual test chart 34. The physical constraints faced by prior art active alignment machines, such as those using multiple collimators, can therefore be avoided, so that the size of an active alignment machine that is necessary for housing a physical test chart can be greatly reduced as compared to the prior art.

Figure 4:
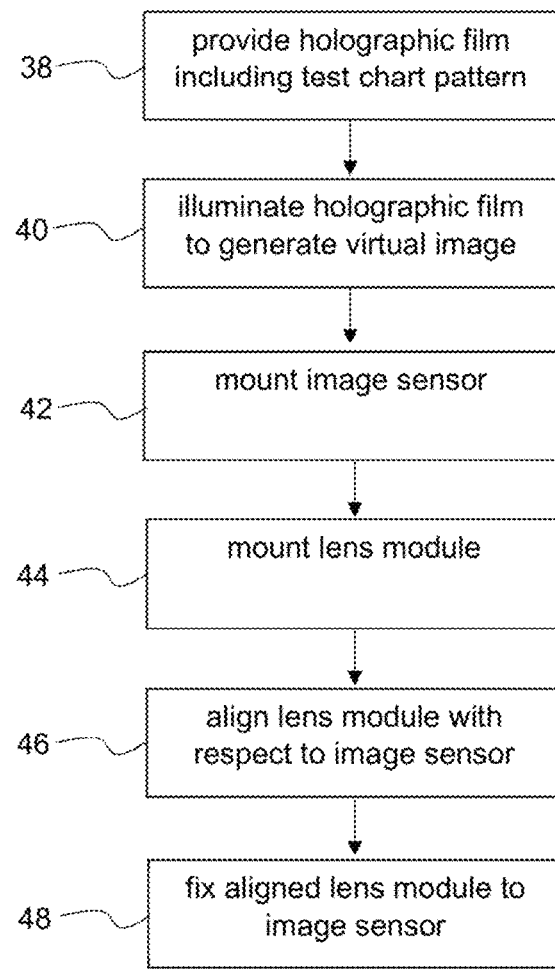
FIG. 4 is a flowchart setting out a method for aligning a lens module with respect to an image sensor in accordance with an embodiment of the present invention.

FIG. 4 is a flowchart setting out a method for aligning a lens module 24 with respect to an image sensor 26 in accordance with an embodiment of the present invention. A holographic film 22 which includes a test chart pattern is first provided (Step 38). The holographic film 22 is illuminated with a laser source 20 in order to generate a virtual image of the test chart pattern (Step 40). An image sensor 26 is mounted onto an image sensor holder 30 (Step 42) and a lens module 24 is mounted onto a lens module holder 28 (Step 44). While viewing the virtual image with the image sensor 26 through the lens module 24, the image sensor holder 30 and the lens module holder 28 manipulate the image sensor 26 and the lens module 24 respectively in order to align the lens module 24 with respect to the image sensor 26 (Step 46) to obtain a focused image of the test chart pattern. After the lens module 24 and the image sensor 26 have been aligned, the lens module 24 is fixed to the image sensor 26 using an adhesive, such as glue, in order to produce a camera module 32 (Step 48).

Figure 5A:
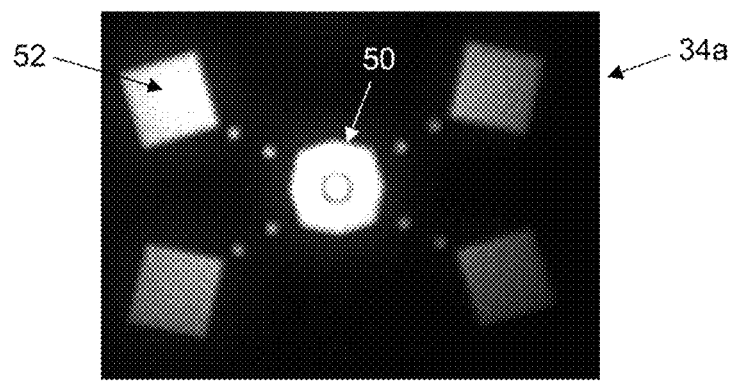
FIG. 5A is an example of a virtually-generated image of a test chart viewed by an image sensor before alignment of the imaging module.

FIG. 5A is an example of a virtually-generated image 34a of a test chart viewed by the image sensor 26 before alignment of the imaging module, for alignment at a virtually-generated distance. The test chart may include a central shape 50 and corner shapes 52 at four respective corners of the virtually-generated image 34a. In FIG. 5A, the corner shapes 52 are clearly out of focus. Therefore, the lens module holder 28 and the sensor holder 30 will re-orientate the lens module 24 and the image sensor 26 relative to each other according to the image that is obtained by the image sensor 26.

Figure 5B:
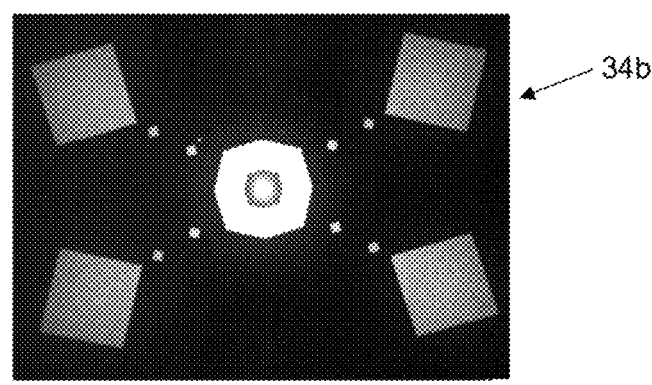
FIG. 5B is an example of the said test chart viewed by the image sensor after the imaging module has been aligned.

FIG. 5B is an example of the virtually-generated image 34b of the said test chart viewed by the image sensor 26 after the imaging module has been aligned. The lens module 24 and the image sensor 26 have been relatively adjusted so that the central shape 50 and the corner shapes 52 are all in focus in order to achieve an optimally-focused image. After such active alignment, the lens module 24 may then be fixedly attached to the image sensor 26 in the optimal relative orientation, by using the adhesive such as glue, to form the camera module 32.

It should be appreciated that by adopting the holographic film 22 in accordance with the described embodiment of the invention, the configuration for implementing a single holographic film 22 is much simpler than using a physical test chart or multiple collimators, and the size of lens alignment apparatus can be significantly reduced. Moreover, minimal conversion effort is required for varying the testing distance of the imaging module, and the size of the pattern generated from the holographic film 22 may remain unchanged over a variety of focusing distances. Since the apparatus is able to generate the same test pattern at any positions within a field of view of the image module, the full image of the testing pattern within the field of view of the imaging module can conveniently be evaluated.

Although the present invention has been described in considerable detail with reference to certain embodiments, other embodiments are possible.

Therefore, the spirit and scope of the appended claims should not be limited to the description of the embodiments contained herein.

The invention claimed is:

1. Alignment apparatus for aligning a lens module with respect to an image sensor, the alignment apparatus comprising:
   a holographic film including a test chart pattern from which a virtual image of the test chart pattern may be generated;
   a light source for illuminating the holographic film;
   an image sensor holder for mounting the image sensor;
   a lens module holder configured and positioned for mounting the lens module between the holographic film and the image sensor such that the virtual image of the test chart pattern is viewable by the image sensor through the lens module;
   wherein the virtual image viewable by the image sensor through the lens module is located at a virtual distance from the image sensor that is different from a physical position of the holographic film for aligning the lens module with respect to the image sensor.

2. The alignment apparatus as claimed in claim 1, wherein the light source comprises a coherent light source.

3. The alignment apparatus as claimed in claim 2, wherein the apparatus further comprises a collimator lens, and the coherent light source is operative to produce coherent light rays which are passed through the collimator lens prior to illuminating the holographic lens.

4. The alignment apparatus as claimed in claim 3, wherein the collimator lens has a variable focal point.

5. The alignment apparatus as claimed in claim 4, wherein the collimator lens comprises a liquid lens.

6. The alignment apparatus as claimed in claim 3, wherein a distance between the light source and the collimator lens is different from a focal length of the collimator lens, such that light rays from the light source are not collimated after passing through the collimator lens.

7. The alignment apparatus as claimed in claim 1, further comprising a positioning mechanism coupled to the light source for adjusting a position of the light source and to vary a separation distance between the light source and the holographic film.

8. The alignment apparatus as claimed in claim 1, wherein the holographic film is a Fourier holographic film.

9. The alignment apparatus as claimed in claim 1, wherein the lens module is operative to focus the virtual image onto the image sensor during relative alignment between the lens module and the image sensor.

10. The alignment apparatus as claimed in claim 9, wherein the lens module holder and the image sensor holder are operative to adjust positions and orientations of the lens module and the image sensor respectively until the image sensor acquires a focused image of the virtual image.

11. Method for aligning a lens module with respect to an image sensor, the method comprising the steps of:
   providing a holographic film including a test chart pattern;
   illuminating the holographic film with a light source to generate a virtual image of the test chart pattern;
   mounting the image sensor on an image sensor holder;
   mounting the lens module on a lens module holder between the holographic film and the image sensor such that the virtual image of the test chart pattern is viewable by the image sensor through the lens module; and
   with the image sensor, viewing the virtual image which is located at a virtual distance from the image sensor that is different from a physical position of the holographic film, whereby to align the lens module with respect to the image sensor.

12. The method as claimed in claim 11, further comprising the step of fixing the lens module and the image sensor to each other to form a camera module after the lens module and the image sensor have been aligned.

13. Method for manufacturing a camera module, the method comprising the steps of:
   providing a holographic film including a test chart pattern;
   illuminating the holographic film with a light source to generate a virtual image of the test chart pattern;
   mounting an image sensor on an image sensor holder;
   mounting a lens module on a lens module holder between the holographic film and the image sensor such that the virtual image of the test chart pattern is viewable by the image sensor through the lens module;
   with the image sensor, viewing the virtual image which is located at a virtual distance from the image sensor that is different from a physical position of the holographic film, whereby to align the lens module with respect to the image sensor; and thereafter
   fixing the lens module and the image sensor to each other to form a camera module after the lens module and the image sensor have been aligned.

* * * * *